US011995393B2

(12) United States Patent
Ozuysal

(10) Patent No.: US 11,995,393 B2
(45) Date of Patent: *May 28, 2024

(54) INTEGRATION OF CONTENT IN NON-BROWSER APPLICATIONS

(71) Applicant: Google LLC, Mountain View, CA (US)

(72) Inventor: Yusuf Ozuysal, Mountain View, CA (US)

(73) Assignee: Google LLC, Mountain View, CA (US)

(*) Notice: Subject to any disclaimer, the term of this patent is extended or adjusted under 35 U.S.C. 154(b) by 17 days.

This patent is subject to a terminal disclaimer.

(21) Appl. No.: 17/447,992

(22) Filed: Sep. 17, 2021

(65) Prior Publication Data

US 2022/0004699 A1   Jan. 6, 2022

Related U.S. Application Data

(63) Continuation of application No. 16/827,197, filed on Mar. 23, 2020, now Pat. No. 11,151,303, which is a
(Continued)

(51) Int. Cl.
*G06F 40/14* (2020.01)
*G06F 3/04817* (2022.01)
(Continued)

(52) U.S. Cl.
CPC .......... *G06F 40/14* (2020.01); *G06F 3/04817* (2013.01); *G06F 3/0482* (2013.01);
(Continued)

(58) Field of Classification Search
CPC .... G06F 3/0483; G06F 9/452; G06F 16/9577; G06F 40/134; G06F 40/14;
(Continued)

(56) References Cited

U.S. PATENT DOCUMENTS 6,414,677 B1   7/2002   Robertson et al.
6,529,948 B1*  3/2003   Bowman-Amuah ........................ G06F 9/4493
                                                        709/219

(Continued)

FOREIGN PATENT DOCUMENTS

CA     2378986 A1    1/2001
CN   101073073 A    11/2007
(Continued)

OTHER PUBLICATIONS

Communication pursuant to Article 94(3) EPC for European Application No. 16854085.4, dated Sep. 21, 2021, 7 pages.
(Continued)

*Primary Examiner* — Kaylee J Huang
(74) *Attorney, Agent, or Firm* — Brake Hughes Bellermann LLP

(57) ABSTRACT

In a general aspect, a computer-implemented method can include executing, on a computing device, a non-browser application; displaying, by the non-browser application on a display of the computing device, a link to web content; and receiving an indication that the link has been selected. In response to the indication that the link has been selected, the method can include, allocating a tab of a browser application to the non-browser application; displaying the allocated browser tab within a user interface of the non-browser application; and displaying, by the allocated browser tab, the web content within the user interface.

19 Claims, 7 Drawing Sheets

Related U.S. Application Data continuation of application No. 14/877,262, filed on Oct. 7, 2015, now Pat. No. 10,613,713.

(51) Int. Cl.
| | |
|---|---|
| *G06F 3/0482* | (2013.01) |
| *G06F 3/0483* | (2013.01) |
| *G06F 3/04842* | (2022.01) |
| *G06F 3/04847* | (2022.01) |
| *G06F 9/451* | (2018.01) |
| *G06F 9/54* | (2006.01) |
| *G06F 16/957* | (2019.01) |
| *G06F 40/134* | (2020.01) |

(52) U.S. Cl.
CPC ........ *G06F 3/0483* (2013.01); *G06F 3/04842* (2013.01); *G06F 3/04847* (2013.01); *G06F 9/452* (2018.02); *G06F 9/54* (2013.01); *G06F 16/9577* (2019.01); *G06F 40/134* (2020.01)

(58) Field of Classification Search
CPC ............... G06F 3/04817; G06F 3/0482; G06F 3/04842; G06F 3/04847; G06F 9/54
USPC ......... 715/760; 709/217, 219, 223, 226, 230
See application file for complete search history.

(56) References Cited

U.S. PATENT DOCUMENTS

| | | | |
|---|---|---|---|
| 7,103,594 B1 | 9/2006 | Wolfe | |
| 7,840,911 B2 * | 11/2010 | Milener | ................ G06F 3/0482 715/822 |
| 8,510,406 B2 | 8/2013 | Kembel et al. | |
| 8,656,265 B1 * | 2/2014 | Paulin | ................... G06F 16/957 715/205 |
| 8,745,168 B1 | 6/2014 | Singleton et al. | |
| 9,959,506 B1 * | 5/2018 | Karppanen | ......... G06F 16/9574 |
| 10,496,254 B1 * | 12/2019 | Morris | .................. G06F 3/0488 |
| 2006/0021031 A1 * | 1/2006 | Leahy | ..................... H04L 67/02 726/22 |
| 2006/0259567 A1 | 11/2006 | Jennings | |
| 2007/0244900 A1 * | 10/2007 | Hopkins | ............... G06F 16/954 |
| 2009/0249251 A1 | 10/2009 | Eischeid et al. | |
| 2011/0060998 A1 | 3/2011 | Schwartz et al. | |
| 2011/0307808 A1 | 12/2011 | Giambalvo et al. | |
| 2012/0066634 A1 | 3/2012 | Kim et al. | |
| 2012/0239504 A1 * | 9/2012 | Curlander | .............. G06Q 30/02 705/14.66 |
| 2012/0324556 A1 * | 12/2012 | Yefimov | ................. H04L 63/08 726/7 |
| 2013/0042188 A1 * | 2/2013 | Dobronsky | ......... G06F 3/04817 715/760 |
| 2013/0073399 A1 * | 3/2013 | Celener Nijamkin | ...................... G06Q 30/0241 705/14.73 |
| 2013/0226992 A1 | 8/2013 | Bapst et al. | |
| 2015/0207854 A1 | 7/2015 | Aiello | |
| 2015/0347741 A1 * | 12/2015 | Krstic | ..................... G06F 21/32 726/19 |
| 2016/0117611 A1 | 4/2016 | Garris et al. | |
| 2016/0277477 A1 * | 9/2016 | Arai | ...................... H04L 67/303 |
| 2016/0364496 A1 * | 12/2016 | Li | ........................... G06F 40/14 |
| 2017/0102845 A1 | 4/2017 | Ozuysal et al. | |

FOREIGN PATENT DOCUMENTS

| | | |
|---|---|---|
| CN | 103473047 A | 12/2013 |
| JP | 2000057036 A | 2/2000 |
| JP | 2003263255 A | 9/2003 |
| JP | 2005266929 A | 9/2005 |
| JP | 2010128994 A | 6/2010 |
| JP | 2011075925 A | 4/2011 |
| JP | 2015095256 A | 5/2015 |
| WO | 0065763 A2 | 11/2000 |
| WO | 0116723 A2 | 3/2001 |
| WO | 2010025373 A1 | 3/2010 |
| WO | 2014062490 A1 | 4/2014 |
| WO | 2015127782 A1 | 9/2015 |

OTHER PUBLICATIONS

Chrome Custom Tabs, retrieved on Mar. 8, 2019, from: https://developer.chrome.com/multidevice/android/customtabs, Aug. 30, 2015, 20 pages.

First Office Action with English translation for Chinese Application No. 201680056854.9, dated Jul. 24, 2020, 23 pages.

Yukiko Sato, "Chrome 45" for Android version, speeding up page reading from apps by "Custom Tabs" instead of WebView, IT Media News online, retrieved on Mar. 8, 2019, from https://www.itmedia.co.jp/news/articles/1509/07/news054.html, Sep. 7, 2015, 6 pages.

International Search and Written Opinion for PCT Application No. PCT/US2016/53737, dated Jan. 12, 2017, 10 pages.

First Office Action with English translation for Chinese Application No. 202111094116.2, dated Nov. 2, 2023, 48 pages.

Harkins, "Force Internet Explorer to open a new browser window from an Office link", TechRepublic, https://www.techrepublic.com/blog/microsoft-office/force-internet-explorer-to-open-a-new-browser-window-from-an-office-link, (retrieved from: http://web.archive.org/web/20131124190813 on Jun. 11, 2020), Nov. 24, 2013, 2 pgs.

Brief Communication Regarding Oral Proceedings for European Application No. 16854085.4, mailed Jan. 30, 2024, 10 pages.

"Utilizing OLE in Office XP/2000", Internet Citation, Jan. 1, 2001, retrieved from http://www.create.cett.msstate.edu/create/howto/ole.pdf on Oct. 14, 2004, XP002300933, 7 pages.

"How do I control how a Word document opens from the internet or an intranet?", Purdue University, retrieved from: https://web.archive.org/web/20080627153620/https://engineering.purdue.edu/ECN/Support/KB/Docs/OpenDocFromNet/, Jun. 27, 2008, 3 pages.

* cited by examiner

INTEGRATION OF CONTENT IN NON-BROWSER APPLICATIONS

CROSS-REFERENCE TO RELATED APPLICATIONS

This application is a continuation of, and claims priority to, U.S. patent application Ser. No. 16/827,197, filed on Mar. 23, 2020, entitled "INTEGRATION OF CONTENT IN NON-BROWSER APPLICATIONS", which claims priority to U.S. patent application Ser. No. 14/877,262, filed on Oct. 7, 2015, entitled "INTEGRATION OF CONTENT IN NON-BROWSER APPLICATIONS", now U.S. Pat. No. 10,613,713, the disclosures of which are incorporated by reference herein in their entirety.

TECHNICAL FIELD

This disclosure relates to presentation of web content. More specifically, this disclosure relates to approaches for presenting (e.g., integrating) web content in a non-browser user application.

BACKGROUND

Application developers (e.g., such as application developers in the mobile computing space) have limited options for displaying web-based (e.g., Internet-based) content corresponding with their applications, such as web content associated with a link (e.g., a hyperlink for a uniform resource locator (URL)) included in content displayed by the associated application. One approach for displaying web content is for application developers to implement their own browser-like functionality within their application interface (e.g., a graphical user interface), such as by using an application programming interface (API) that provides basic browser functionality. However, such approaches can have drawbacks, such as lack of browsing security and also an inability to provide a unified web browsing experience for a user across multiple applications.

Another approach for displaying web content associated with an application is for application developers to have the application intent out to a browser application (e.g., a full featured browser application) to display (e.g., show, render, etc.) the associated web content. While, such approaches may provide browsing security, they require a significant context switch from the application user interface (UI) to the browser UI. This context switch can take a significant amount of time (e.g., to start the browser application, load the web content and render the web content), which can adversely impact the user experience. Further, a user may abandon (e.g., not return) to the application from the browser application (e.g., due to the lag and/or continuing on in the browser application), which is undesirable for application developers in retaining user engagement with their application.

SUMMARY

According to one general aspect, a computer-implemented method can include executing, on a computing device, a non-browser application; displaying, by the non-browser application on a display of the computing device, a link to web content; and receiving an indication that the link has been selected. The computer-implemented method can also include, in response to the indication that the link has been selected, allocating a tab of a browser application to the non-browser application; displaying the allocated browser tab within a user interface of the non-browser application; and displaying, by the allocated browser tab, the web content within the user interface.

Implementations can include one or more of the following features. For example, the computing device can be a mobile computing device. The non-browser application and the allocated browser tab can be executed as separate processes by the computing device. The allocated browser tab can include at least one menu item defined by the browser application; at least one menu item defined by the non-browser application; at least one button defined by the browser application; and/or at least one button defined by the non-browser application. The indication that the link has been selected can include at least one customization parameter for the allocated browser tab.

In response to the displaying the link to the web content, the method can include sending, by the non-browser application, a pre-intent request to the browser application, the pre-intent request including a uniform resource locator (URL) corresponding with the link to the web content. In response to the pre-intent request, the method can include performing, by the browser application, at least one operation corresponding with displaying the web content.

The pre-intent request can include at least one customization parameter for the allocated browser tab. The at least one customization parameter can include one or more of a menu item and a corresponding action associated with the menu item; an icon corresponding with the non-browser application; a button and a corresponding action associated with the button; a color corresponding with the user interface; and an animation to be used for displaying the allocated browser tab within the user interface.

The at least one operation corresponding with displaying the web content can include one or more of launching the browser application; loading a native library of the browser application; performing a domain name system (DNS) lookup based on the URL; connecting to a server corresponding with the DNS lookup; downloading the web content from the server; and rendering the downloaded web content.

In another general aspect, a computer-implemented method can include executing, on a computing device, a non-browser application and displaying, by the non-browser application on a display of the computing device, a link to web content. The method can further include, in response to the displaying the link to the web content, sending a pre-intent request to a browser application, the pre-intent request including a uniform resource locator (URL) corresponding with the link to the web content. The method can still further include, in response to the pre-intent request, performing, by the browser application, at least one operation corresponding with displaying the web content and receiving a signal indicating selection of the link. In response to the receiving the signal, the method can include allocating a tab of the browser application to the non-browser application, the pre-intent request further including at least one customization parameter for the allocated browser tab; displaying, in accordance with the at least one customization parameter, the allocated browser tab within a user interface of the non-browser application; and displaying, by the allocated browser tab, the web content within the user interface.

Implementations can include one or more of the following features. For example, the at least one customization parameter can include one or more of a menu item and corresponding action associated with the menu item; an icon; a button and corresponding action associated with the button;

a color corresponding with the user interface; and an animation to be used for displaying the allocated browser tab within the user interface.

The at least one operation corresponding with displaying the web content includes one or more of launching the browser application; loading a native library of the browser application; performing a domain name system (DNS) lookup based on the URL; connecting to a server corresponding with the DNS lookup; downloading the web content from the server; and rendering the web content.

The non-browser application and the allocated browser tab can be executed as separate processes by the computing device. The method can include displaying the URL in the allocated browser tab. The method can include displaying a secure socket layer (SSL) state corresponding with the web content displayed in the allocated browser tab.

The allocated browser tab can have access to at least one resource of the browser application. The at least one resource of the browser application can include one or more of an electronic payment service; a language translation service; a browsing history; form autofill data; and a password vault.

The performing the at least one operation corresponding with displaying the web content in response to the pre-intent request can include performing the at least one operation corresponding with displaying the web content in a background browser process of the computing device, with the non-browser application being executed as a foreground process of the computing device.

In another general aspect, a non-transitory computer readable medium can have instructions stored thereon. The instructions, when executed by at least one processor of a computing device, can cause the computing device to execute a non-browser application; display, by the non-browser application on a display of the computing device, a link to web content; and receive an indication that the link has been selected. In response to the indication that the link has been selected, the instructions, when executed by the at least one processor, can cause the computing device to allocate a tab of a browser application to the non-browser application. The instructions, when executed by at least one processor of a computing device, can further cause the computing device to display the allocated browser tab within a user interface of the non-browser application and display, by the allocated browser tab, the web content within the user interface.

Implementations can include one or more of the following features. For example, the instructions, when executed by the at least one processor, can cause the computing device to, in response to the displaying the link to the web content send, by the non-browser application, a pre-intent request to the browser application, the pre-intent request including a uniform resource locator (URL) corresponding with the link to the web content; and in response to the pre-intent request, perform, by the browser application, at least one operation corresponding with displaying the web content in a background process.

In another general aspect, a computer-implemented method can include receiving, from a non-browser application, a request for content of a first type. The computer-implemented method can further include providing, to the non-browser application, a user interface element for a browser application. The non-browser application can display content of a different, second type that is created specifically for the non-browser application. The computer-implemented method can also include modifying the user interface element for a user interface of the non-browser application to display, for the non-browser application, the content of the first type.

Implementations can include one or more of the following features. For example, the content of the first type can include web content. The content of the first type can include content not specifically created for display by the non-browser application. The user interface element can include a browser tab. Modifying the user interface element can include applying at least one customization parameter to the user interface element.

The details of one or more implementations are set forth in the accompanying drawings and the description below. Other features will be apparent from the description and drawings, and from the claims.

BRIEF DESCRIPTION OF THE DRAWINGS

Like reference symbols in the various drawings indicate like elements.

DETAILED DESCRIPTION

In the following description, specific details are set forth to provide an understanding of example implementations of systems and corresponding methods for integrating web content in a non-browser application. It will be apparent, however, that the disclosed implementations can be practiced without some of these specific details. In other instances, well-known structures and techniques have not been shown in detail so as not to obscure the disclosure.

In the approaches described herein, an interface (e.g., an API) is provided between a browser application, e.g., a browser application, and a non-browser application. The provided interface can be used to facilitate the non-browser application requesting allocation of a browser tab to obtain, render and/or display content within a user interface (UI) of the non-browser application, such as using the techniques described herein. In some implementations, the non-browser application can be executed on a computing device, where execution of the non-browser application can include displaying application content (e.g., non-web content incorporated in the application code, or other content created specifically for the non-browser application) in the application's UI, where that application content can include a link (e.g., a hyperlink) to other content, e.g., web content. In an implementation, the application content can include multiple links to respective web content. In the disclosed implementations, non-browser applications can take any number of forms. For instance, a non-browser application can be an email application, a social media application, a photo sharing application, a news service application, a consumer services application, etc.

The non-browser application can further interact with the browser application, via the interface, to request that the browser application be initialized, if necessary, and request that the browser application, after initialization, preload web content associated with one or more links included in the displayed application content. The web content that is preloaded can be identified by the non-browser application in the request made to the browser application, or the browser application itself can identify web content to preload based on other information, such as a user browsing history (e.g., to identify a most likely link of the application content to be selected by the user).

Figure 1:
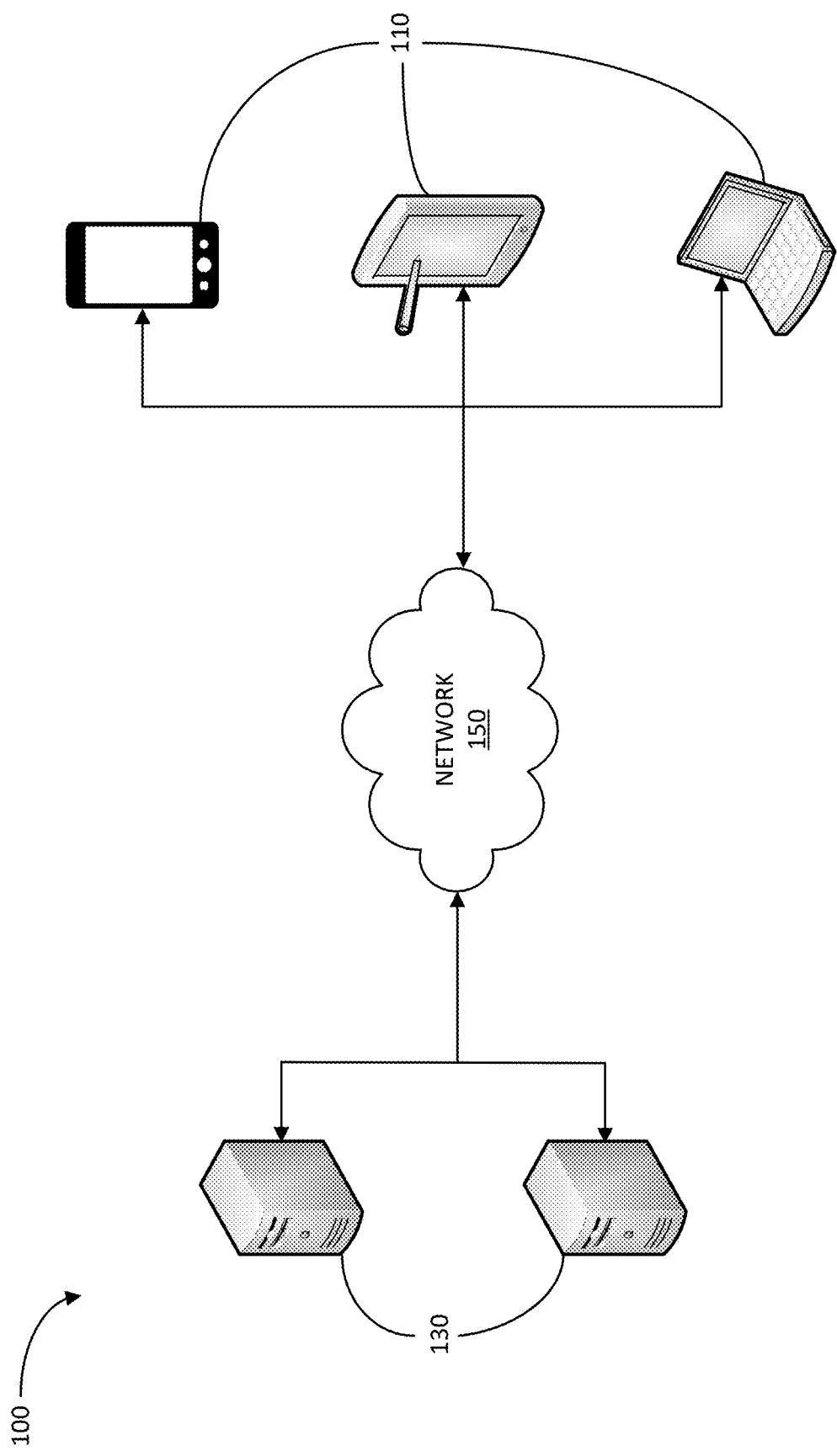
FIG. 1 is a diagram of a system for integrating web content in a non-browser application, according to an implementation.

FIG. 1 is a diagram of a system 100 for integrating display of web content in a non-browser application, according to an implementation. The system 100 includes clients 110 and servers 130. In the system 100, the clients 110 and the servers 130 are connected over a network (e.g., a data network, such as the Internet) 150.

In the system 100, each of the clients 110 can be configured to run a browser application for accessing, downloading, rendering and/or displaying web content (web content), such as websites, executable web content, etc.). In the approaches described herein, the browser application may implement independent browser tabs for rendering and displaying web content, where each browser tab can be used to display respective (e.g., different) web content, and multiple browser tabs can be associated with (e.g., implemented by) a single browser application process.

In certain implementations, the clients 110 can be configured to download and install such a browser application from one of the servers 130. The browser application can be configured to run on clients 130 that are mobile computing devices and/or non-mobile computing devices. For example, the clients 110 could be desktop computers, laptop computers, mobile computing devices (e.g., a smartphones, tablet computers, etc.), set top boxes (e.g., for use with a television (TV)), smart TVs, video game consoles, or any other devices having appropriate processor, memory, and data network communications capabilities.

In the implementations described herein, a tab (browser tab) of the browser application can be allocated to a non-browser application, where the allocated browser tab can be used to display web content within a user interface of the non-browser application. In such implementations, the allocated browser tab can be referred to as being embedded in the non-browser application, running on top of the non-browser application, being integrated in a user interface (UI) of the non-browser application, and so forth. In some implementations, an allocated browser tab may be used to display web content within a user-interface of a non-browser application, with the browser tab remaining under the control of the browser application. In other implementations, an allocated browser tab may be used to display web content within a user-interface of a non-browser application, with the allocated browser tab being under the control of the non-browser application. In still other implementations, an allocated browser tab may be used to display web content within a user-interface of a non-browser application, with the allocated browser tab being cooperatively under the control of both the non-browser application and the browser application.

In other implementations, the browser application can be used to preload (e.g., access, download and/or render) web content corresponding with a link (hyperlink) included in content of (displayed by) the non-browser application. Such approaches may allow for that web content to be displayed by an allocated browser tab within (on top of, embedded in, etc.) a UI of the non-browser application with little or no lag time, as compared to loading and rendering that web content in response to selection of an associated link in application (non-web-based) content displayed by the non-browser application. In certain instances, different versions and/or configurations of the browser application that include features disclosed herein are available for download from a server 130 and subsequent installation on a client 110. The particulars of such downloading and/or installation can depend, at least, on whether the client 110 is a mobile computing device or non-mobile computing device. The browser application, once installed on a client 110, can be configured to load web content (e.g., web pages) from any one or more of multiple servers 130 that are configured to host the web content. The servers 130 can be any device having an appropriate processor, memory, and communications capability for hosting data files configured to install the web browser and/or for hosting the web content.

The network 150 can include, for example, any one or more of a personal area network (PAN), a local area network (LAN), a campus area network (CAN), a metropolitan area network (MAN), a wide area network (WAN), a broadband network (BBN), a wireless LAN (WLAN) the Internet, etc. Further, the network 150 can include, but is not limited to, any one or more of the following network topologies, including a bus network, a star network, a ring network, a mesh network, a star-bus network, a tree or hierarchical network, and so forth.

In an implementation, the browser application, when executed on a client 110, can be configured to receive a request (a signal, an indication, and so on) from the non-browser application to load web content in the browser application, with the browser application (and any associated browser tabs) being run in the background (e.g., as a background process), while the non-browser application runs (executes, etc.) in the foreground (e.g., as a foreground process). In some implementations, if the browser application is not already running in the background, the browser application can be initialized (or "warmed up") in the background prior to loading the web content in the background, such as in response to a request from the non-browser application to load web content. The web content to be preloaded can be identified by the non-browser application (e.g., by a link in the non-browser application) or identified by the browser application) in response to other data, such as a browsing history, a list of favorite web sites, a browsing cookie jar, etc.

Figure 2:
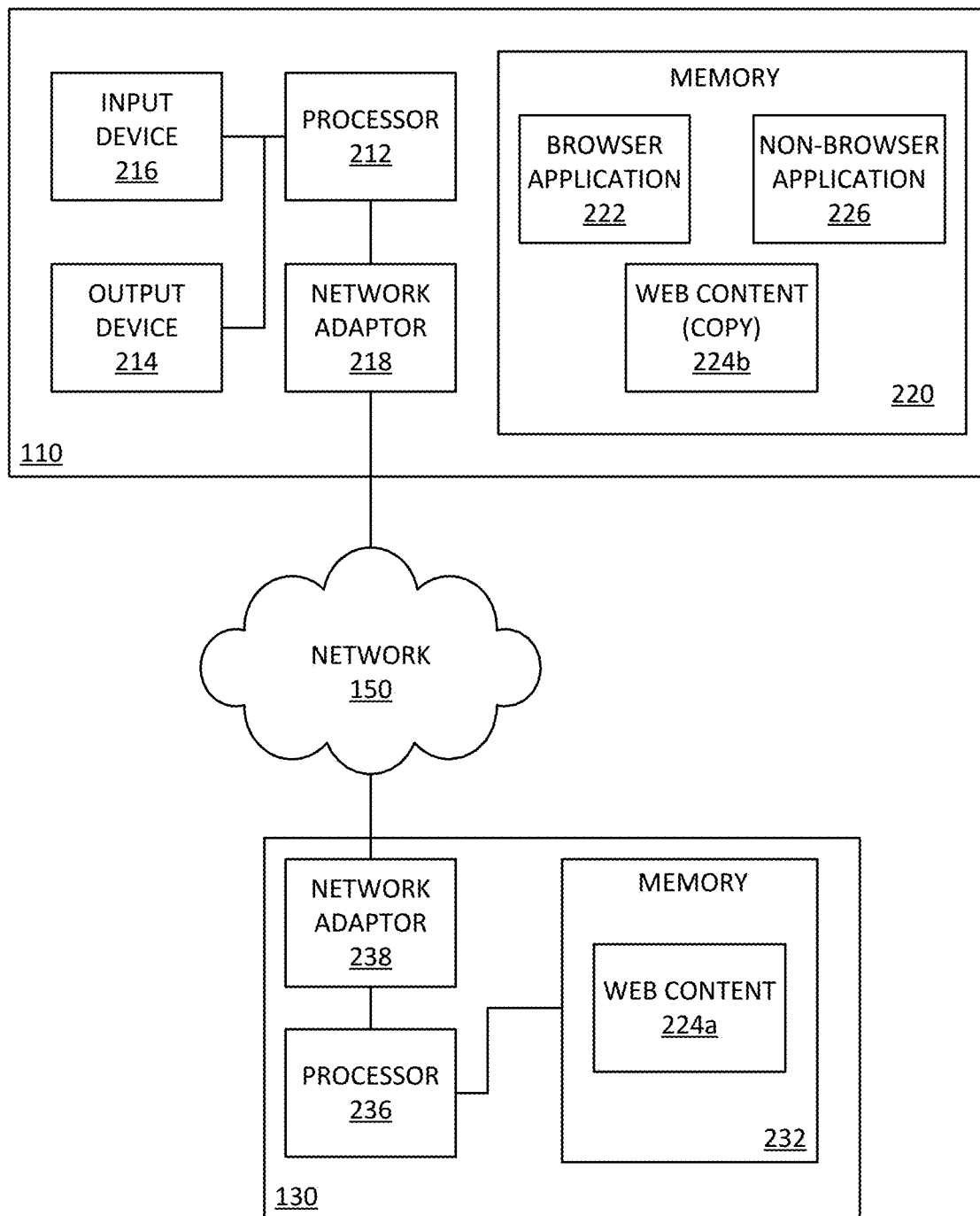
FIG. 2 is a block diagram illustrating an example client and server of the system of FIG. 1, according to an implementation.

FIG. 2 is a block diagram illustrating an example client 110 and a server 130 of the system of FIG. 1, according to an implementation. As in FIG. 1, the client 110 and the server 130 in FIG. 2 are connected over the network 150 (e.g., via respective network adaptors 218 and 238). The network adaptors 218 and 238 can be configured to interface with the network 150 and to send and receive information, such as data, requests, responses, and commands to other devices on the network 150. The network adaptors 218 and 238 can be, for example, cellular radios, Wi-Fi adaptors, Ethernet network interface cards, and so forth.

As shown in FIG. 2, the client 110 includes a processor 212, the network adaptor 218, and a memory 220. In the example of FIG. 2, the memory 220 of the client 110 can include a browser application 222, a non-browser application 226 and a client copy of web content 224b. For instance, the web content copy 224b can be obtained (from the web content 224a in the server 130) by the browser application 222, rendered in a tab of the web browser 222 allocated to the non-browser application 226 and displayed (e.g., using an output device 214 (e.g., a display) of the client 110) in a browser tab of the browser application 222 that is included in (displayed in, allocated to, etc.) a UI of the non-browser application 226. As shown in FIG. 1, the client 110 can also include an input device 216, such as a keyboard, touchscreen, touchpad or mouse, to receive user input, such as link selections, text input, etc.

The processor 212 of the client 110 can be configured to execute instructions, such as instructions physically coded into the processor 212, instructions received from software (e.g., the browser application 222 and/or the non-browser application) in memory 240, or a combination of both, to preload content in the browser application 222 (e.g., for display in an allocated browser tab in a UI of the non-browser application 226). For example, the processor 212 of the client 110 can execute instructions of the browser application 222 to receive (e.g., via an interface of the browser application 222) a request from the non-browser application 226 to load or preload the web content copy 224b in the a browser tab (allocated to the non-browser application 226) of the browser application 222.

As illustrated in FIG. 2, the web content copy 224b can be a copy of the web content 224a that is downloaded by the browser application 222, over the network 150, from the server 130 and stored in the memory 220 of the client 110 as the web content copy 224b. In some instances, the content copy 224b to be preloaded by the browser application 222 can already reside in the memory 220 of the client 110. For example, the web content copy 224b could be a cached copy of the web content 224a that was previously obtained by the browser application 222 and stored in the memory 220 of the client 110.

The request from the non-browser application 226 to the browser application 222 can be in response to selection of a link that is included in (associated with) application content that is displayed in a UI of the non-browser application. Such a request can be referred to as an "intent" request, a "direct intent" request, and so forth. In other instances, the request from the non-browser application 226 to the browser application 222 can be a preliminary request to preload the web content 224a (as web content copy 224b) in the browser application 222 (e.g., a tab of the browser application) in anticipation that a link associated with the web content 224a will be selected (e.g. by a user). Such a preliminary request can be referred to as a "pre-intent" request, a "pending intent" request, etc. In other words, such preliminary requests can be sent prior to selection of a corresponding link included in application content that is displayed in a UI of the non-browser application 226.

The request (e.g., direct or preliminary) can be received by the browser application 222 from the non-browser application 226 via an API of the browser application 222. In response to receiving the request, the browser application 222 can load, or preload the web content 224a (e.g., as the web content copy 224b), e.g., in a browser tab allocated to the non-browser application 226. As described herein, the non-browser application 226, when making the request to load or preload web content, can be running as a foreground process. The requested web content 224a can then be loaded and/or rendered by the browser application 222 (e.g., in a browser tab) in the background.

As described herein, when receiving the request from the non-browser application 226, the browser application 222 can be running, or can be initialized as a background process, that is, an application process that is not visible to a user. The request (e.g., direct or preliminary), when provided to an API of the browser application 222, may indicate that the web content 224a is to be downloaded from the server 130 by the browser application 222 over the network 150. Once downloaded, the web content 224a can then be stored as the web content copy 224b in the memory 220 of the client 110 for loading or preloading by the browser application 222 (or can be directly loaded or preloaded into the browser application 222 from the network adaptor 238). When the browser application 222 is not running in the background (e.g., as a background process), or is otherwise not in a state to download the content 224a, the browser application 222 can be initialized (re-initialized, started, warmed up, etc.), in the background, in response to such a request from the non-browser application 226 being received by the browser application 222. Once initialized, the browser application 222 can load or preload web content 224a or web content copy 224b, e.g., in a browser tab that is allocated to (associated with) the non-browser application 226.

The processor 212 of the client 110 can also be configured to load or preload the web content 224a or the web content copy 224b in a browser tab of the browser application 222 in response to the request (e.g., direct or preliminary) from the non-browser application 226, and/or in response to a selection (e.g., by a user) of a link (to the web content 224a) that is included in (associated with) application content that is displayed by the non-browser application 222. The browser application 222 can be configured to then render and display the web content 224a (or the web content copy 224b) using an allocated browser tab of the browser application included in (e.g., embedded in, running on top of, etc.) a UI of the non-browser application 226.

In certain implementations, the browser application 222 can be configured to receive another (second) request from the non-browser application 226 indicating the (preloaded) web content 224a or web content copy 224b is not needed (e.g., a different link in application content of the non-browser application 226 was selected). In response to the second request, the browser application 222 can be configured to unload (discard) the preloaded web content from the browser application 222 (e.g. from a browser tab of the browser application 222). For example, if the non-browser application 226 initially requests the browser application to preload the web content 224a (or the web content copy 224b) in the background, but it is later determined (e.g., by the non-browser application 226) that the preloaded web content is not needed (e.g., due to selection of a different link than a predicted link), then the non-browser application 226 can inform the browser application 222 that the preloaded web content is not needed and the browser application 222 can unload or otherwise discard the preloaded web content (e.g., stored as web content copy 224b) from memory 220 of the client 110.

The non-browser application 226 can either directly identify the web content 224a to be preloaded by the browser application 222, or can provide information to the browser application 222 as part of its request, so that the browser application 222 can evaluate the information from the non-browser application 226 to determine the web content 224a to preload. For instance, the web content 224*a* to be preloaded in the browser application 222 (e.g., a browser tab of the browser application 222) can be a web page or other appropriate web content. In such instances, when the non-browser application 226 is configured to directly identify the web content 224*a* to be loaded or preloaded by the browser application 222, the request from the non-browser application 226 to preload content can include an address (e.g., a URL) of the web content 224*a* to be loaded or preloaded by the browser application 222 (e.g., in the background).

In other instances where the non-browser application 226 is configured to provide information to the browser application 222 as part of the request so that the browser application 222 can evaluate the information from the non-browser application 226 to determine the web content 224*a* to preload, the request from the non-browser application 226 to preload content can include a browsing history of the user, and/or other information to use to determine (e.g., predict) what web content 224*a* to preload. The browser application 222 can then identify the content 224*a* to preload in the browser application 222 (e.g., a browser tab) based on the browsing history and/or the other information.

In other instances where the non-browser application 226 is configured to provide information to the browser application 222 as part of the request so that the browser application 222 can evaluate the information from the non-browser application 226 to determine the web content 224*a* to preload, the browser application 222 may identify the content to preload in the browser application 222 based on a probability value that a link for the content to preload will be selected by the user in the non-browser application 226. For example, if the non-browser application 226 indicates to the browser application 222 that a user of the non-browser application 226 is currently viewing application content about local restaurants, the browser application 222 can preload web content corresponding with links for one or more restaurants that are included in the application content being displayed in a UI of the non-browser application 226 (e.g., based on a determination that the restaurants corresponding with the preloaded links meet a threshold probability that they are most likely to be selected by a user in the non-browser application 226). As such, the content to be preloaded in the browser application 222 is not limited to one item of content, but can be multiple items of content, such as multiple web pages.

In implementations where the non-browser application 226 is configured to provide information to the browser application 222 as part of the request so that the browser application 222 can evaluate the information from the non-browser application 226 to determine the web content 224*a* to preload, the request from the non-browser application 226 to preload content can include input (e.g., text or other input) that is entered by a user in the non-browser application 226 (e.g., using input device 216). The browser application 222 can then identify the content 224*a* to preload in (a browser tab of) the browser application 222 based on the input currently entered by the user in the non-browser application.

For instance, continuing with the previous example, if the non-browser application 226 indicates to the browser application 222 that a user of the non-browser application 226 has entered "Thai" in a search input field of the non-browser application 226, the browser application 222 may preload web content corresponding with one or more web pages for Thai restaurants (e.g., such as Thai restaurants corresponding with links included in application content being displayed by the non-browser application 226).

Figure 3:
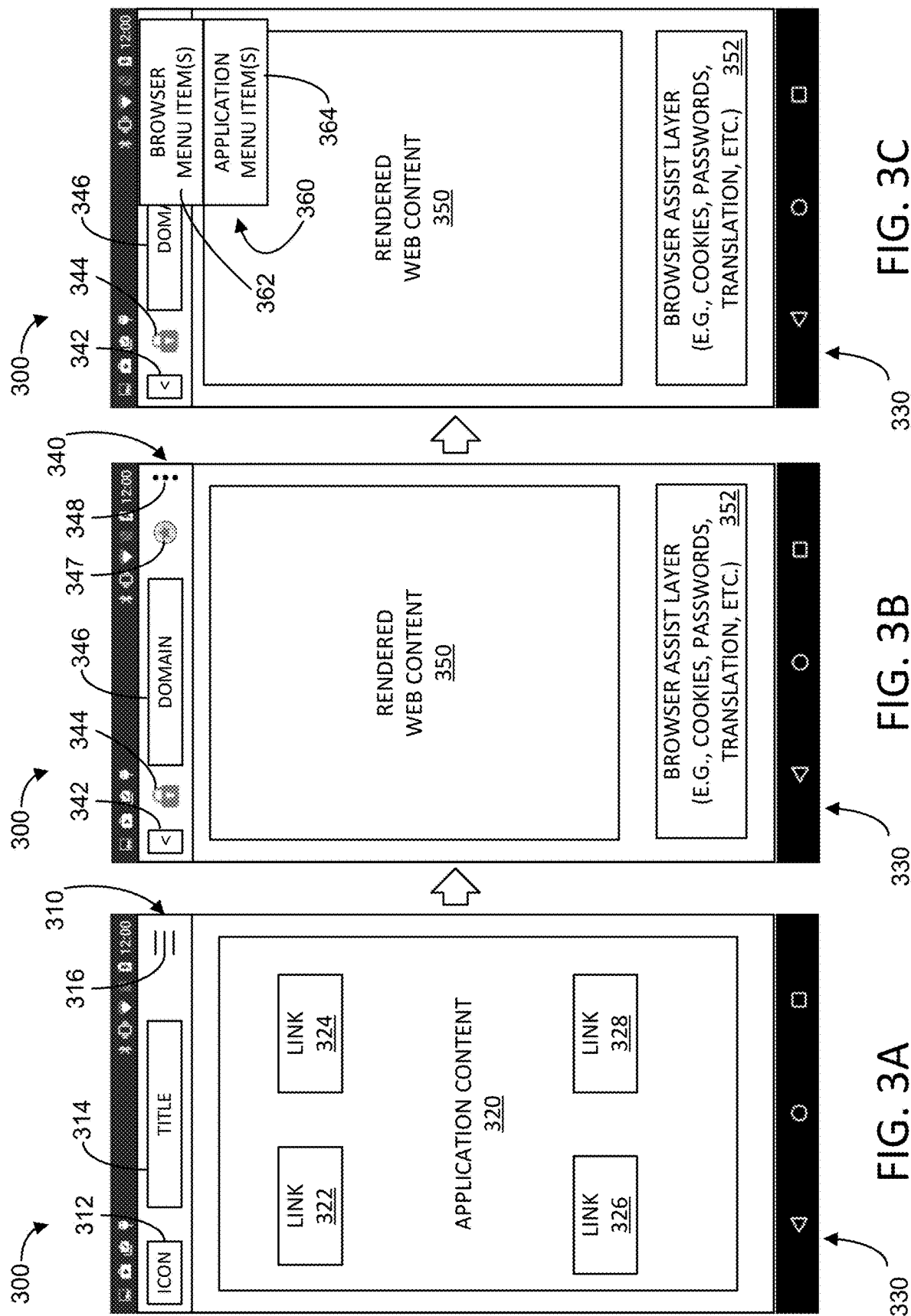
FIGS. 3A, 3B and 3C are diagrams illustrating integration of web content in a non-browser application on a computing device, according to an implementation.

FIGS. 3A, 3B and 3C are diagrams illustrating integration of web content in a non-browser application running (executing, etc.) on a mobile computing device (mobile device) 300, according to an implementation. The implementation shown in FIGS. 3A, 3B and 3C is given by way of example and for purposes of illustration. In other implementations, other configurations can be used to integrate display (rendering) of web content in a non-browser application. In the discussion of FIGS. 3A, 3B and 3C, some elements are shown schematically (e.g., in block diagram form), while others are shown graphically. The particular arrangement and details of a given implementation will depend, at least, on the specific non-browser application, browser application and web content being displayed (rendered). Also, for purposes of illustration, FIGS. 3A, 3B and 3C will be described with further reference to FIGS. 1 and 2, as appropriate. For instance, the mobile device 300 can be used to implement a client device 110, such as illustrated in FIGS. 1 and 2.

FIG. 3A illustrates a user interface (graphical user interface) 310 of a non-browser application (such as the non-browser application 226) that is displayed on an output device (e.g., a display panel) of the mobile device 300, such as the output device 214 of the client 110. The user interface 310, in this example, includes an icon 312, a title 314, a menu icon 316 and application content 320. The mobile device 300 also includes a navigation button panel 330 that can be used to control various operations and functions of the mobile device 300, such as navigation buttons on a smartphone. The user interface 310 can also be displayed using colors, fonts and/or other aesthetic elements corresponding with the associated non-browser application 226. In this example implementation, such colors, fonts and/or other aesthetic elements can be indicated, by the non-browser application 226, in an intent request (direct of preliminary) and used when displaying integrated web content in a browser tab allocated to the non-browser application 226. Such an approach can provide a user with a "seamless" visual experience when viewing web content in a non-browser application, as opposed to current approaches that perform a context switch to the browser application 222.

In the user interface 310 of FIG. 3A, the icon 312 can be an icon that corresponds with the non-browser application 226. Likewise, the title 314 can be used to display a name (e.g., a stylized logo) indicating the particular non-browser application 226 being executed, with its user interface 310 being displayed on the mobile device 300. The menu icon 316 can be used to open a menu (e.g., an application operations menu) for the non-browser application 226. A menu associated with the menu icon 316 can include various menu items than can be selected by a user of the mobile device 300 to cause the non-browser application 226 to perform associated actions (operations, tasks and so forth) of the non-browser application 226.

The application content 320 can be graphical content, or other visual content (e.g. video content, text content, etc.) that is displayed by the non-browser application 226. In certain implementations, the application content 320 can be displayed in conjunction with audio content that is played by an audio system (not shown) of the mobile device 300. As illustrated in FIG. 3A, the application content 320 can include links 322, 324, 326 and 328 (e.g., hyperlinks including respective URLs) that are associated with respective web content. While four links are shown in FIG. 3A, in other implementations fewer or additional links can be used.

The links 322, 324, 326 and 328 shown in FIG. 3A can each respectively correspond with a visual element of the application content 320, such as an image, an icon, text, a video and so forth. As discussed herein, one or more of the links 322, 324, 326 and 328 can be provided to the browser application 222 (in a direct-intent and/or preliminary intent request). For purposes of clarity and illustration, the remaining discussion of FIGS. 3A, 3B and 3C will be described in the context of a single link (link 322) being included in an intent request (direct or preliminary). It will be appreciated that, in certain implementations, information for multiple links can be included in an intent request. In other implementations, separate intent requests can be sent for each link.

After receiving an intent request (direct or preliminary), the browser application 222 can then, in response to such an intent request, perform operations (e.g., background operations) to obtain associated web content 224a (e.g., which can be stored as web content copy 224b), and load and/or render the obtained web content in a browser tab that is (can be, or will be) allocated to the non-browser application 226. As noted above, an intent request can include indications of colors, fonts and/or other aesthetic elements corresponding with the non-browser application 226. The browser application 222 can render the web content 224b in accordance with those indications. Display of the web content in the allocated browser tab (within a user interface of the non-browser application 226) can, accordingly, be rendered so that it is aesthetically consistent with display of the application content 320.

In this example, in response to a user selecting the link 322 shown in FIG. 3A, the user interface of the non-browser application 226 displayed by the mobile device 300 can transition from displaying the application content 320, as shown in FIG. 3A, to displaying the corresponding web content 224a (or web content copy 224b) in an allocated browser tab 340, as shown in FIG. 3B. As described herein, the web content 224b can be obtained (as a copy of web content 224a) by the browser application 222 in response to an intent request and rendered in the allocated browser tab 340 in the background, prior to its display within the user interface of the non-browser application 226, as shown in FIG. 3B. The transition from the display of FIG. 3A to FIG. 3B can be made in accordance with an animation that is defined by the non-browser application (e.g., in an intent request). For instance, the transition could be a slide-in transition, a fade-in/fade-out transition, a dissolve-out/dis-solve-in transition, etc.

As shown in FIG. 3B, the allocated browser tab 340 can include a back button 342, a security state icon 344, a domain indicator 346, an icon and/or button 347, a menu icon 348, rendered web content 350 (rendered from the web content 224b) and a browser assist layer 352 (which may or may not include visual elements that are displayed with the rendered web content 350). In this example, selection of the back button 342 may cause the display (of the allocated browser tab 140) on the mobile device 300 illustrated in FIG. 3B to transition back to the display (of the application content 320) shown in FIG. 3A. The security state icon 342 can indicate whether the rendered web content 350 was obtained using a secure connection (e.g., through a secure socket layer (SSL)) or an unsecure connection. The domain indicator 346 can be used to indicate a domain (e.g., a web location or URL) from which the rendered web content 350 was obtained. In some implementations, the domain indicator 346 may be a display only (non-editable) indicator.

Also in the allocated browser tab 340, the icon and/or button 347 can be an icon corresponding with the non-browser application 226. The icon and/or button 347 can cause, in response to selection of (e.g., clicking) of the icon and/or button 347, an action (operation) of the non-browser application 226 (or the browser application) to be performed. The particular action associated with the icon and/or button 347 will depend on the specific implementation, and can be defined as part of a corresponding intent request. Further, selection of the menu icon 348 can result in a menu (e.g., different than the application menu associated with the menu icon 316) to be displayed, such as the menu 360 shown in FIG. 3C, which is discussed in further detail below.

In the example shown in FIG. 3B, the browser assist layer 352 can provide the non-browser application 226 (e.g., when displaying the allocated browser tab 140) access to features of the browser application 326. Such features can include a browser cookie jar, a browsing history, a language translation service, a password vault (repository, etc.), and so forth. The particular features available in (via, from and so on) the browser assist layer 352 will depend, at least, on the particular browser application 222 that is used to render web content on the mobile device 300.

As noted above, FIG. 3C illustrates a menu 360 that may displayed in response to selection of the menu icon 348 in FIG. 3B. As shown in FIG. 3C, the menu 360 can include one or more browser menu items 362, and one or more application menu items 364. In such an approach, the browser menu items 362 (and associated operations) can be defined by the browser application 222 and included in the allocated browser tab 340, while the application menu items 364 (and associated operations) can be defined by the non-browser application 226 (e.g., in an intent request) and included in the menu 360 of the allocated browser tab 340 (e.g., by the browser application 222). Selection of a browser menu item 362 or an application menu item 364 can cause the mobile device 300 to carry out a respective associated operation. The particular operations associated with the browser menu items 362 and the application menu items 364 will depend on the particular implementation.

Figure 4:
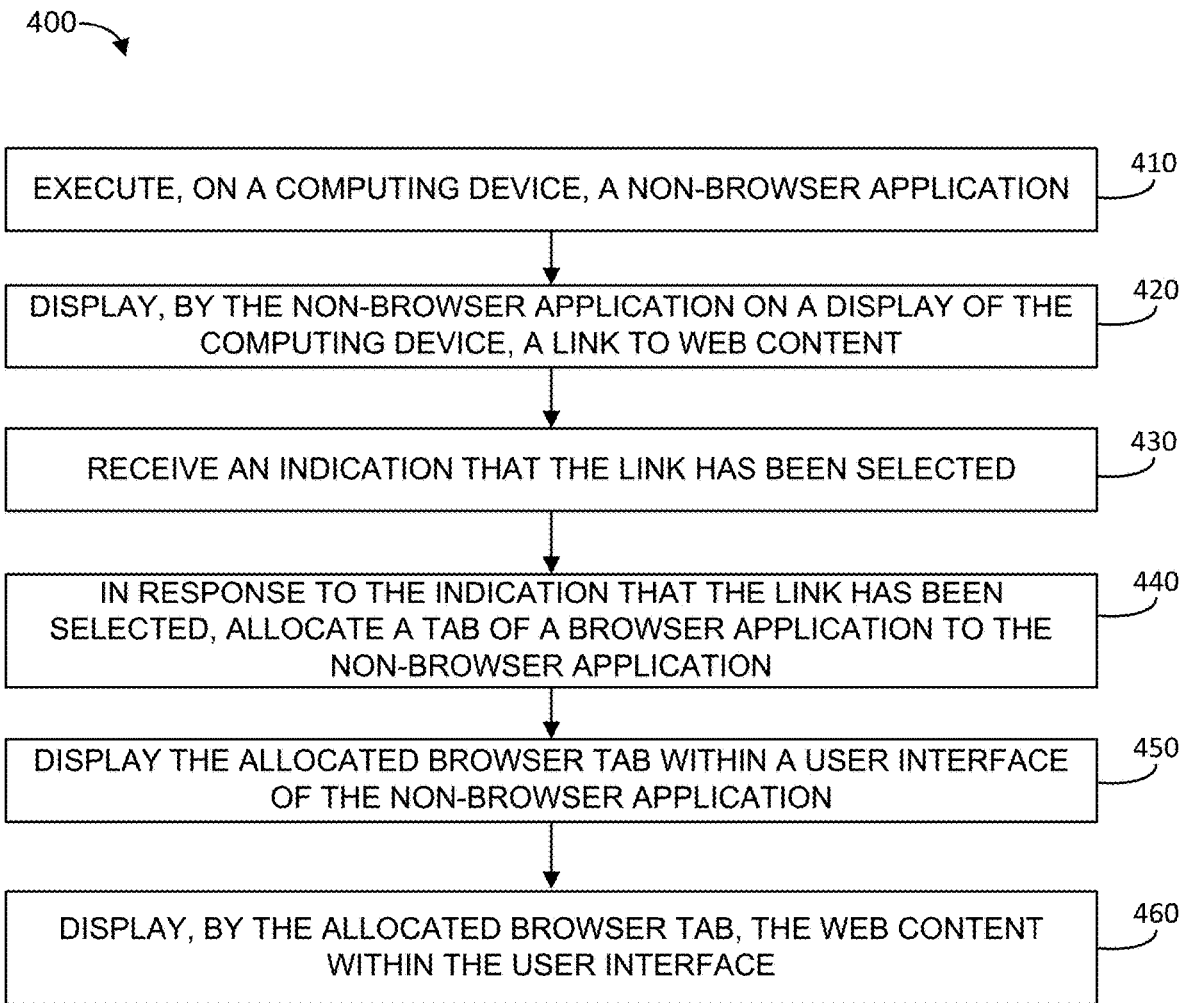
FIG. 4 is a flowchart illustrating a method for integrating web content in a non-browser application, according to an implementation.

FIG. 4 is a flowchart illustrating a method 400 for integrating web content (e.g., display and/or rendering of web content) in a non-browser application, according to an implementation. In this example implementation, the method 400 can be implemented in the system 100 shown in FIG. 1 using the techniques and approaches described with respect to FIG. 2 and FIGS. 3A-3C. Accordingly, for purposes of illustration, the method 400 will be described with further reference to FIGS. 1, 2 and 3A-3C. It will be appreciated, however, that in other implementations, the method 400 can be implemented in systems and devices having other arrangements.

At block 410, the method 400 can include executing, on the mobile device 300, the non-browser application 226. At block 420, the method 400 can include displaying, by the non-browser application 226 on a display (output device 214) of the mobile device 300, a link (the link 322) to web content 224a. At block 430, the method 400 can include receiving an indication (selection) that the link 322 has been selected. At block 440, in response to the indication that the link 322 has been selected, the method 400 can include allocating the browser tab 340 of the browser application 222 to the non-browser application 226. At block 450, the method 400 can include displaying the allocated browser tab 340 within the user interface of the non-browser application 222. Further, the method 400 can include, at block 460, displaying, by (in, with, etc.) the allocated browser tab 340, the web content 224a (or web content copy 224b) within the user interface of the non-browser application.

In the method 400, the indication that the link has been selected at block 420 can include at least one customization parameter for the allocated browser tab. The at least one customization parameter can include, at least one of: a menu item and corresponding action associated with the menu item; an icon; a button and corresponding action associated with the button; a color corresponding with the user interface; and an animation to be used for displaying the allocated browser tab within the user interface.

In this example, the non-browser application 226 and the allocated browser tab 340 can be executed as separate processes by the mobile device 300 (e.g., where the allocated browser tab is executed as part of a process associated with the browser application 222. Further in the method 400, the allocated browser tab can include, one or more of, at least one menu item defined by the browser application; at least one menu item defined by the non-browser application; at least one button defined by the browser application; and at least one button defined by the non-browser application. Such menu items can operate using the approaches described herein.

Figure 5:
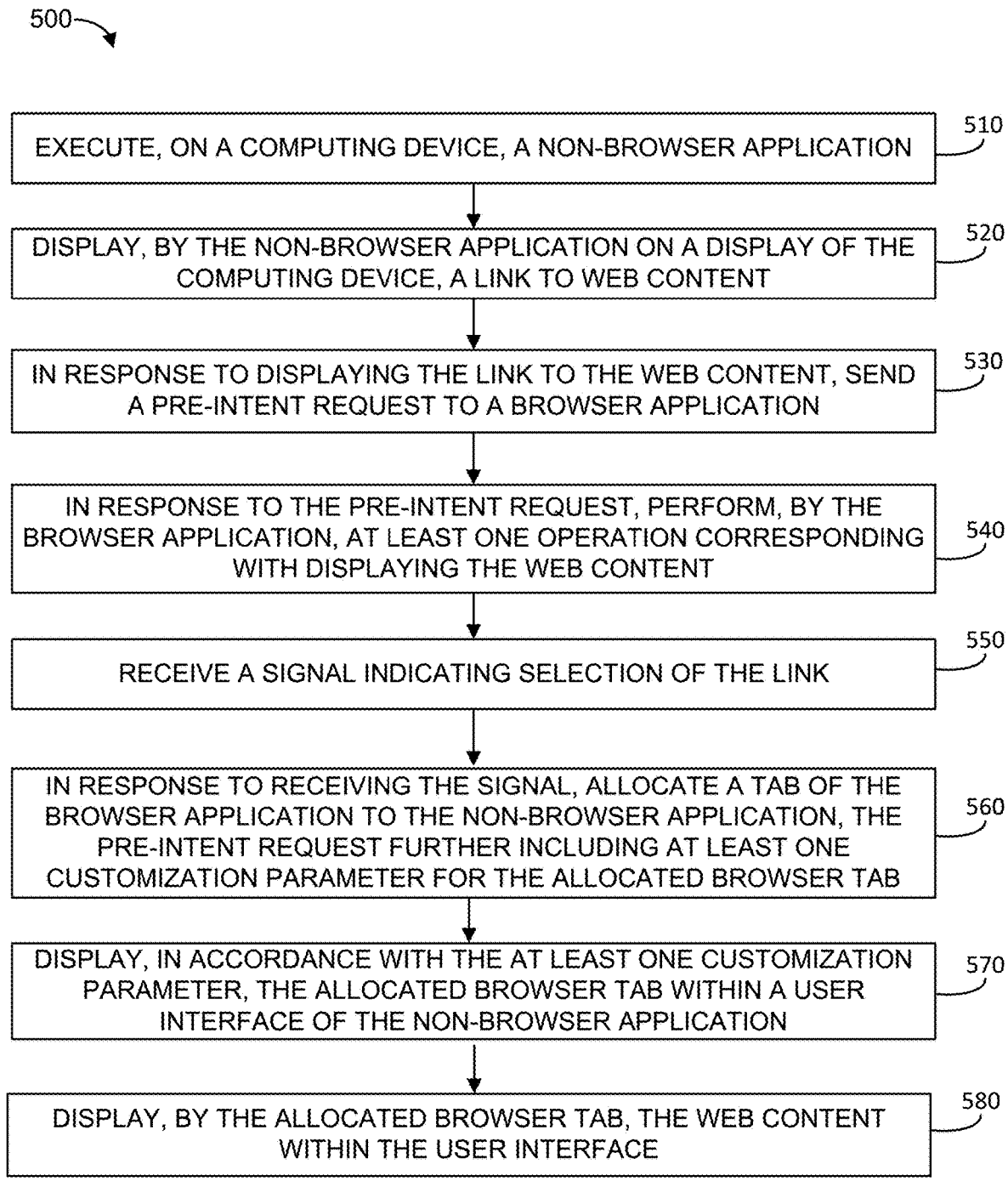
FIG. 5 is a flowchart illustrating another method for integrating web content in a non-browser application, according to an implementation.

FIG. 5 is a flowchart illustrating another method 500 for integrating web content (e.g., display of rendered web content) in a non-browser application, according to an implementation. In this example implementation, as with the method 400, the method 500 can be implemented in the system 100 shown in FIG. 1 using the techniques and approaches described with respect to FIG. 2 and FIGS. 3A-3C. Accordingly, for purposes of illustration, the method 500 will also be described with further reference to FIGS. 1, 2 and 3A-3C. It will be appreciated, however, that in other implementations, the method 500 can be implemented in systems and devices having other arrangements.

At block 510, the method 500 can include executing, on the mobile device 300, the non-browser application 226 and, at block 520, displaying, by the non-browser application 226 on a display (e.g., the output device 214) of the mobile device 300, a link (e.g., the link 322) to web content 224a. In response to the displaying the link 322 to the web content 224a, the method 500 can include, at block 530, sending a pre-intent request to a browser application. The pre-intent request of block 530 can include a uniform resource locator (URL) corresponding with the link to the web content 224a. At block 540, in response to the pre-intent request, the method 500 can include performing, by the browser application 226, at least one (background) operation corresponding with displaying the web content 224a.

At block 550, the method 500 can include receiving a signal indicating selection of the link 322 (e.g., by a user of the mobile device 300). In response to receiving the signal at block 550, the method 500 can include, at block 560, allocating a tab (the browser tab 340) of the browser application 222 to the non-browser application 226. As described herein, the pre-intent request of block 530 can further include at least one customization parameter for the allocated browser tab 340, such as the customization parameters described with respect to the method 400.

At block 570, the method 500 can include displaying, in accordance with the at least one customization parameter of block 560, the allocated browser tab 340 within a user interface of the non-browser application 226. Further, the method 500 can include, at block 580, displaying, by the allocated browser tab 340, the web content 224a (or web content copy 224b) within the user interface of the non-browser application, such as illustrated in FIG. 3B.

In the method 500, the at least one operation corresponding with displaying the web content at block 540 can include one or more of: launching the browser application; loading a native library of the browser application; performing a domain name system (DNS) lookup based on the URL; connecting to a server corresponding with the DNS lookup; downloading the web content from the server; and rendering the web content (e.g., in accordance with the at least one customization parameter of block 560). In the method 500, as with the method 400, the non-browser application 226 and the allocated browser tab 340 can be executed as separate processes by the mobile device 300. In other instances, the non-browser application 226 and the allocated browser tab 340 can be executed as part of a same process on the mobile device 300, where the allocated browser tab 340 is under control of the non-browser application 226. Further, performing the at least one operation corresponding with displaying the web content 224a (or the web content copy 224b), at block 540, in response to the pre-intent request at block 530 can include performing the at least one operation corresponding with displaying the web content (such as those discussed above) in a background process of the browser application 222 on the mobile device 300, while the non-browser application 226 is executed as a foreground process on the mobile device 300.

Displaying the web content at block 580 can include displaying a URL (domain) associated with the web content 224a in the allocated browser tab 340. Additionally, displaying the web content at block 580 can also include displaying a secure socket layer (SSL) state corresponding with the web content displayed in the allocated browser tab, such as with the security state icon 344.

In the method 500, the allocated browser tab 340 can have access to at least one resource of the browser application 222, such as via the browser assist layer 352. Such resources of the browser application 222 can include one or more of: an electronic payment service; a language translation service; a browsing history; form autofill data; and a password vault, though other browser resources may also be accessible.

Figure 6:
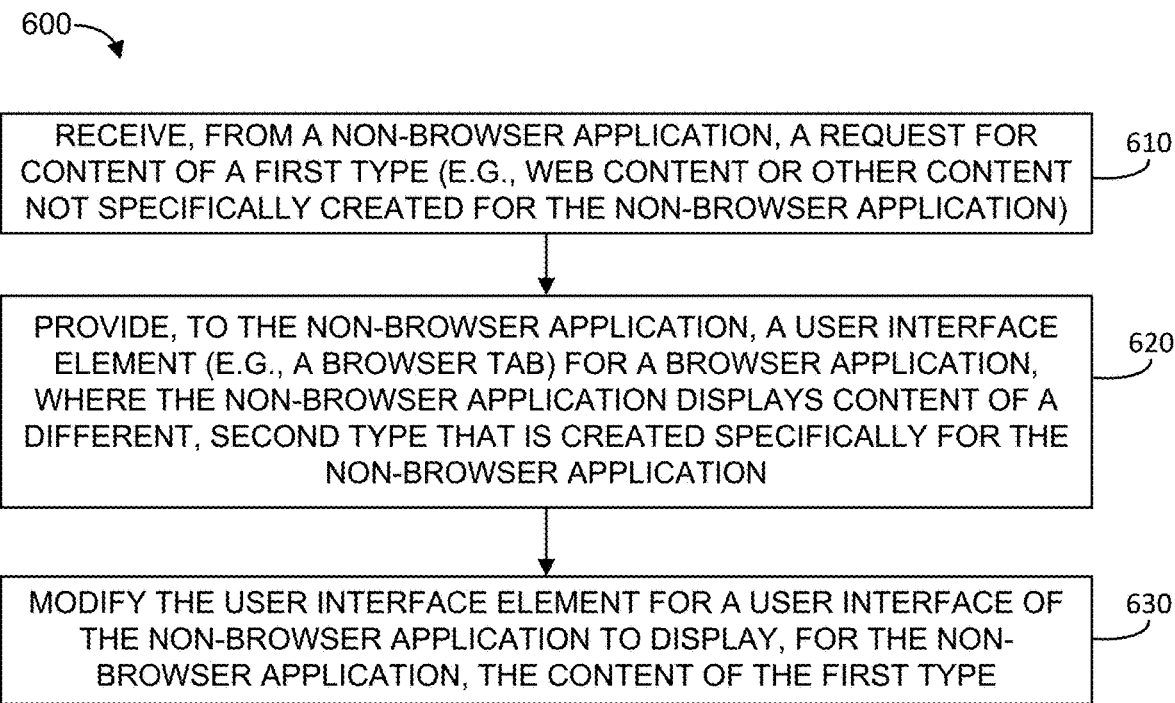
FIG. 6 is a flowchart illustrating another method for integrating web content in a non-browser application, according to an implementation.

FIG. 6 is a flowchart illustrating another method 600 for integrating content in a non-browser application (e.g., displaying content not specifically created for the non-browser application), according to an implementation. In this example implementation, as with the methods 400 and 500, the method 600 can be implemented in the system 100 shown in FIG. 1 using techniques and approaches similar to those described with respect to FIG. 2 and FIGS. 3A-3C. Accordingly, for purposes of illustration, the method 600 will also be described with further reference to FIGS. 1, 2 and 3A-3C, as appropriate. It will be appreciated, however, that in other implementations, the method 600 can be implemented in systems and devices having other arrangements, and with content other than web content.

At block 610, the method 600 can include receiving, from a non-browser application (e.g., the non-browser application 226), a request for content of a first type. The content of the first type can be content that is not specifically created for display by the non-browser application. For instance, in one implementation, the first type of content can be web content 224a or web content (copy) 224b. In other implementations, the content of the first type can be content other than web content. At block 620, the method 600 can include providing, to the non-browser application, a user interface element for a browser application (e.g., such as the browser application 222), where the non-browser application displays content of a different, second type that is created specifically for the non-browser application. The second type of content can include text, images, hyperlinks and so forth. In an implementation, the user interface element can be a browser tab. In other implementations, the user interface element could take other forms, such a browser window, a pop-up window, etc.

At block 630, the method 600 can include modifying the user interface element for a user interface of the non-browser application to display, for the non-browser application, the content of the first type. The modifying, at block 630, can include integrating the user interface element (e.g., a browser tab) into the user interface of the non-browser application, such as using the approaches described herein. For instance, modifying the user interface element can include applying at least one customization parameter to the user interface element, such as the customization parameters described herein.

According to one general aspect, a computer-implemented method can include executing, on a computing device, a non-browser application; displaying, by the non-browser application on a display of the computing device, a link to web content; and receiving an indication that the link has been selected. The computer-implemented method can also include, in response to the indication that the link has been selected, allocating a tab of a browser application to the non-browser application; displaying the allocated browser tab within a user interface of the non-browser application; and displaying, by the allocated browser tab, the web content within the user interface.

Implementations can include one or more of the following features. For example, the computing device can be a mobile computing device. The non-browser application and the allocated browser tab can be executed as separate processes by the computing device. The allocated browser tab can include at least one menu item defined by the browser application; at least one menu item defined by the non-browser application; at least one button defined by the browser application; and/or at least one button defined by the non-browser application. The indication that the link has been selected can include at least one customization parameter for the allocated browser tab.

In response to the displaying the link to the web content, the method can include sending, by the non-browser application, a pre-intent request to the browser application, the pre-intent request including a uniform resource locator (URL) corresponding with the link to the web content. In response to the pre-intent request, the method can include performing, by the browser application, at least one operation corresponding with displaying the web content.

The pre-intent request can include at least one customization parameter for the allocated browser tab. The at least one customization parameter can include one or more of a menu item and a corresponding action associated with the menu item; an icon corresponding with the non-browser application; a button and a corresponding action associated with the button; a color corresponding with the user interface; and an animation to be used for displaying the allocated browser tab within the user interface.

The at least one operation corresponding with displaying the web content can include one or more of launching the browser application; loading a native library of the browser application; performing a domain name system (DNS) lookup based on the URL; connecting to a server corresponding with the DNS lookup; downloading the web content from the server; and rendering the downloaded web content.

In another general aspect, a computer-implemented method can include executing, on a computing device, a non-browser application and displaying, by the non-browser application on a display of the computing device, a link to web content. The method can further include, in response to the displaying the link to the web content, sending a pre-intent request to a browser application, the pre-intent request including a uniform resource locator (URL) corresponding with the link to the web content. The method can still further include, in response to the pre-intent request, performing, by the browser application, at least one operation corresponding with displaying the web content and receiving a signal indicating selection of the link. In response to the receiving the signal, the method can include allocating a tab of the browser application to the non-browser application, the pre-intent request further including at least one customization parameter for the allocated browser tab; displaying, in accordance with the at least one customization parameter, the allocated browser tab within a user interface of the non-browser application; and displaying, by the allocated browser tab, the web content within the user interface.

Implementations can include one or more of the following features. For example, the at least one customization parameter can include one or more of a menu item and corresponding action associated with the menu item; an icon; a button and corresponding action associated with the button; a color corresponding with the user interface; and an animation to be used for displaying the allocated browser tab within the user interface.

The at least one operation corresponding with displaying the web content includes one or more of launching the browser application; loading a native library of the browser application; performing a domain name system (DNS) lookup based on the URL; connecting to a server corresponding with the DNS lookup; downloading the web content from the server; and rendering the web content.

The non-browser application and the allocated browser tab can be executed as separate processes by the computing device. The method can include displaying the URL in the allocated browser tab. The method can include displaying a secure socket layer (SSL) state corresponding with the web content displayed in the allocated browser tab.

The allocated browser tab can have access to at least one resource of the browser application. The at least one resource of the browser application can include one or more of an electronic payment service; a language translation service; a browsing history; form autofill data; and a password vault.

The performing the at least one operation corresponding with displaying the web content in response to the pre-intent request can include performing the at least one operation corresponding with displaying the web content in a background browser process of the computing device, with the non-browser application being executed as a foreground process of the computing device.

In another general aspect, a non-transitory computer readable medium can have instructions stored thereon. The instructions, when executed by at least one processor of a computing device, can cause the computing device to execute a non-browser application; display, by the non-browser application on a display of the computing device, a link to web content; and receive an indication that the link has been selected. In response to the indication that the link has been selected, the instructions, when executed by the at least one processor, can cause the computing device to allocate a tab of a browser application to the non-browser application. The instructions, when executed by at least one processor of a computing device, can further cause the computing device to display the allocated browser tab within a user interface of the non-browser application and display, by the allocated browser tab, the web content within the user interface.

Implementations can include one or more of the following features. For example, the instructions, when executed by the at least one processor, can cause the computing device to, in response to the displaying the link to the web content send, by the non-browser application, a pre-intent request to the browser application, the pre-intent request including a uniform resource locator (URL) corresponding with the link to the web content; and in response to the pre-intent request, perform, by the browser application, at least one operation corresponding with displaying the web content in a background process.

In another general aspect, a computer-implemented method can include receiving, from a non-browser application, a request for content of a first type. The computer-implemented method can further include providing, to the non-browser application, a user interface element for a browser application. The non-browser application can display content of a different, second type that is created specifically for the non-browser application. The computer-implemented method can also include modifying the user interface element for a user interface of the non-browser application to display, for the non-browser application, the content of the first type.

Implementations can include one or more of the following features. For example, the content of the first type can include web content. The content of the first type can include content not specifically created for display by the non-browser application. The user interface element can include a browser tab. Modifying the user interface element can include applying at least one customization parameter to the user interface element.

Figure 7:
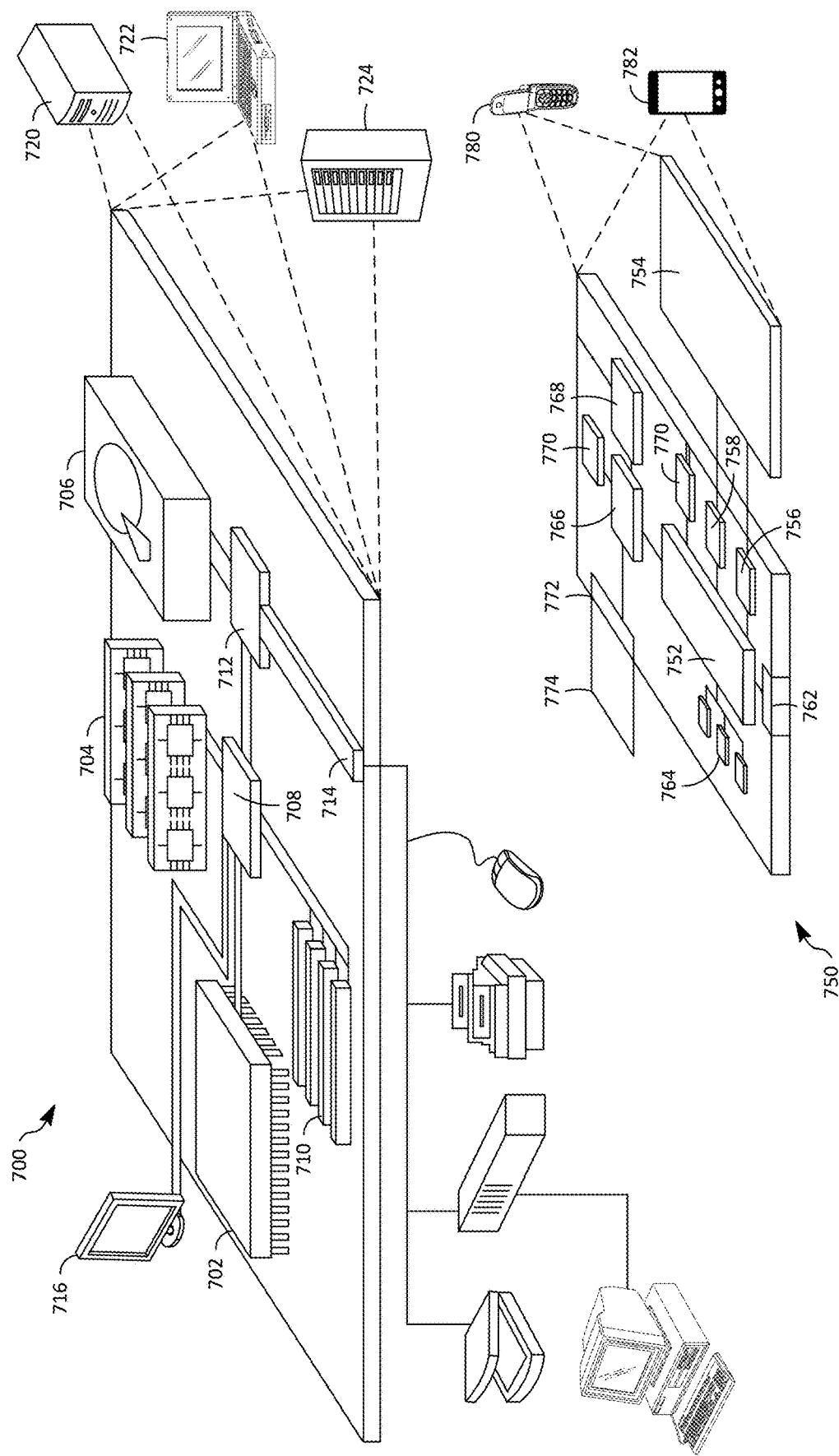
FIG. 7 is a diagram illustrating an example of a computer device and a mobile computer device that can be used to implement the techniques described here.

FIG. 7 shows an example of a generic computer device 700 and a generic mobile computer device 750, which may be used with the techniques described here. Computing device 700 is intended to represent various forms of digital computers, such as laptops, desktops, workstations, personal digital assistants, servers, blade servers, mainframes, and other appropriate computers. Computing device 750 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 700 includes a processor 702, memory 704, a storage device 706, a high-speed interface 708 connecting to memory 704 and high-speed expansion ports 710, and a low speed interface 712 connecting to low speed bus 714 and storage device 706. Each of the components 702, 704, 706, 708, 710, and 712, are interconnected using various busses, and may be mounted on a common motherboard or in other manners as appropriate. The processor 702 can process instructions for execution within the computing device 700, including instructions stored in the memory 704 or on the storage device 706 to display graphical information for a GUI on an external input/output device, such as display 716 coupled to high speed interface 708. In other implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 704 stores information within the computing device 700. In one implementation, the memory 704 is a volatile memory unit or units. In another implementation, the memory 704 is a non-volatile memory unit or units. The memory 704 may also be another form of computer-readable medium, such as a magnetic or optical disk.

The storage device 706 is capable of providing mass storage for the computing device 700. In one implementation, the storage device 706 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 704, the storage device 706, or memory on processor 702.

The high speed controller 708 manages bandwidth-intensive operations for the computing device 700, while the low speed controller 712 manages lower bandwidth-intensive operations. Such allocation of functions is exemplary only. In one implementation, the high-speed controller 708 is coupled to memory 704, display 716 (e.g., through a graphics processor or accelerator), and to high-speed expansion ports 710, which may accept various expansion cards (not shown). In the implementation, low-speed controller 712 is coupled to storage device 706 and low-speed expansion port 714. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 720, or multiple times in a group of such servers. It may also be implemented as part of a rack server system 724. In addition, it may be implemented in a personal computer such as a laptop computer 722. Alternatively, components from computing device 700 may be combined with other components in a mobile device (not shown), such as device 750. Each of such devices may contain one or more of computing device 700, 750, and an entire system may be made up of multiple computing devices 700, 750 communicating with each other.

Computing device 750 includes a processor 752, memory 764, an input/output device such as a display 754, a communication interface 766, and a transceiver 768, among other components. The device 750 may also be provided with a storage device, such as a microdrive or other device, to provide additional storage. Each of the components 750, 752, 764, 754, 766, and 768, are interconnected using various buses, and several of the components may be mounted on a common motherboard or in other manners as appropriate.

The processor 752 can execute instructions within the computing device 750, including instructions stored in the memory 764. The processor may be implemented as a chipset of chips that include separate and multiple analog and digital processors. The processor may provide, for example, for coordination of the other components of the device 750, such as control of user interfaces, applications run by device 750, and wireless communication by device 750.

Processor 752 may communicate with a user through control interface 758 and display interface 756 coupled to a display 754. The display 754 may be, for example, a TFT LCD (Thin-Film-Transistor Liquid Crystal Display) or an OLED (Organic Light Emitting Diode) display, or other appropriate display technology. The display interface 756 may comprise appropriate circuitry for driving the display 754 to present graphical and other information to a user. The control interface 758 may receive commands from a user and convert them for submission to the processor 752. In addition, an external interface 762 may be provide in communication with processor 752, so as to enable near area communication of device 750 with other devices. External interface 762 may provide, for example, for wired communication in some implementations, or for wireless communication in other implementations, and multiple interfaces may also be used.

The memory 764 stores information within the computing device 750. The memory 764 can be implemented as one or more of a computer-readable medium or media, a volatile memory unit or units, or a non-volatile memory unit or units. Expansion memory 774 may also be provided and connected to device 750 through expansion interface 772, which may include, for example, a SIMM (Single In Line Memory Module) card interface. Such expansion memory 774 may provide extra storage space for device 750, or may also store applications or other information for device 750. Specifically, expansion memory 774 may include instructions to carry out or supplement the processes described above, and may include secure information also. Thus, for example, expansion memory 774 may be provide as a security module for device 750, and may be programmed with instructions that permit secure use of device 750. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 764, expansion memory 774, or memory on processor 752, that may be received, for example, over transceiver 768 or external interface 762.

Device 750 may communicate wirelessly through communication interface 766, which may include digital signal processing circuitry where necessary. Communication interface 766 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 768. In addition, short-range communication may occur, such as using a Bluetooth, WiFi, or other such transceiver (not shown). In addition, GPS (Global Positioning System) receiver module 770 may provide additional navigation- and location-related wireless data to device 750, which may be used as appropriate by applications running on device 750.

Device 750 may also communicate audibly using audio codec 760, which may receive spoken information from a user and convert it to usable digital information. Audio codec 760 may likewise generate audible sound for a user, such as through a speaker, e.g., in a handset of device 750. Such sound may include sound from voice telephone calls, may include recorded sound (e.g., voice messages, music files, etc.) and may also include sound generated by applications operating on device 750.

The computing device 750 may be implemented in a number of different forms, as shown in the figure. For example, it may be implemented as a cellular telephone 780. It may also be implemented as part of a smart phone 782, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of implementations have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Therefore, other implementations are within the scope of the following claims.

What is claimed is:

1. An apparatus comprising:
   at least one processor; and
   a non-transitory computer readable medium including executable instructions stored thereon, the executable instructions, when executed by the at least one processor cause the at least one processor to:
      in response to user selection of a link to web content displayed on a user interface of a non-browser application, receive a request at a browser application, the request including a location of the web content and a customization parameter that identifies a custom menu item of an action executable by the non-browser application;
      in response to the request, retrieve the web content from a server computer using the location of the web content; and
      render a customized browser tab of the browser application according to the customization parameter, the customized browser tab having a web content area that displays the web content and a browser control area having the custom menu item.

2. The apparatus of claim 1, wherein the customization parameter is a first customization parameter, wherein the request includes a second customization parameter that identifies a custom display attribute of a browser tab.

3. The apparatus of claim 2, wherein the browser control area includes a toolbar section with at least one of a forward navigation icon or a back navigation icon, and the custom display attribute is a custom color for the toolbar section.

4. The apparatus of claim 2, wherein the custom display attribute defines a color of a background of the browser control area.

5. The apparatus of claim 1, wherein the browser control area includes a read-only address field with a security indicator.

6. The apparatus of claim 1, wherein the customized browser tab is associated with a browser assist layer configured to provide the non-browser application access to at least one feature of the browser application, wherein the at least one feature includes at least one of a browser cookie jar, a browsing history, or a language translation service.

7. The apparatus of claim 1, wherein the executable instructions include instructions that when executed by the at least one processor cause the at least one processor to:
   prior to receipt of the user selection of the link to the web content, receive an initialization request to initialize the browser application.

8. A method comprising:
   in response to user selection of a link to web content displayed in a user interface of a non-browser application, receiving a request at a browser application, the request including a location of the web content and a customization parameter that defines a custom menu item of an action of the non-browser application;
   in response to the request, retrieving the web content from a server computer using the location of the web content; and
   rendering a customized browser tab of the browser application according to the customization parameter, the customized browser tab including a web content area that displays the web content, the customized browser tab having a browser control area that displays the custom menu item and a browser menu item associated with an action of the browser application.

9. The method of claim 8, wherein the customization parameter is a first customization parameter, the request including a second customization parameter that identifies a custom display attribute of a browser tab, the browser control area having the custom display attribute.

10. The method of claim 9, wherein the custom display attribute defines a color of a background of only the browser control area.

11. The method of claim 8, wherein the browser control area includes a toolbar section with at least one of a forward navigation icon or a back navigation icon.

12. The method of claim 8, wherein the browser control area includes a read-only address field with a security indicator.

13. The method of claim 8, wherein the customized browser tab is associated with a browser assist layer configured to provide the non-browser application access to at least one feature of the browser application.

14. The method of claim 13, wherein the at least one feature includes at least one of a browser cookie jar, a browsing history, or a language translation service.

15. The method of claim 8, further comprising:
   prior to receipt of the user selection of the link to the web content, receiving an initialization request to initialize the browser application.

16. A non-transitory computer-readable medium storing executable instructions that when executed by at least one processor cause the at least one processor to execute operations, the operations comprising:
   in response to user selection of a link to web content displayed in a user interface of a non-browser application, receiving a request at a browser application, the request including a location of the web content and a customization parameter that identifies a custom menu item of an action executable by the non-browser application;
   in response to the request, retrieving the web content from a server computer using the location of the web content; and
   rendering a customized browser tab of the browser application according to the customization parameter, the customized browser tab having a web content area that displays the web content and a browser control area having the custom menu item.

17. The non-transitory computer-readable medium of claim 16, wherein the customization parameter is a first customization parameter, wherein the request includes a second customization parameter that identifies a custom display attribute of a browser tab.

18. The non-transitory computer-readable medium of claim 16, wherein the browser control area is a portion of the customized browser tab that is separate from the web content area.

19. The non-transitory computer-readable medium of claim 16, wherein the customized browser tab is associated with a browser assist layer configured to provide the non-browser application access to at least one feature of the browser application, wherein the at least one feature includes at least one of a browser cookie jar, a browsing history, or a language translation service.

* * * * *